March 29, 1960

R. C. DAVIS ET AL 2,930,640

FLEXIBLE JOINT

Filed Aug. 30, 1954

INVENTORS
Allen L. Everitt,
BY James E. Frederick,
& Raymond C. Davis

THEIR ATTORNEY

March 29, 1960

R. C. DAVIS ET AL 2,930,640

FLEXIBLE JOINT

Filed Aug. 30, 1954

INVENTORS
Allen L. Everitt,
BY James E. Frederick,
& Raymond C. Davis

THEIR ATTORNEY

United States Patent Office 2,930,640
Patented Mar. 29, 1960

2,930,640

FLEXIBLE JOINT

Raymond C. Davis, Allen L. Everitt, and James E. Frederick, Dayton, Ohio, assignors to General Motors Corporation, Detroit, Mich., a corporation of Delaware Application August 30, 1954, Serial No. 452,755

3 Claims. (Cl. 287—85)

This invention relates to bushings and is particularly concerned with resilient bushings and related parts together with the methods for making such bushings.

It is the prime object of the invention to provide a resilient bushing and method for assembling said bushing wherein the stresses on the resilient portion thereof are equalized so that the bushing assembly is simplified.

In carrying out the above object, it is a further object to provide a resilient bushing and assembly method wherein the assembly operation is carried out in a single step and wherein the bushing so assembled is maintained in the desired assembled condition after the operation through the use of predetermined dimensional limitations concerning the diameter of the rubber part and the diameter of the metal retaining sleeves.

A still further object of the invention is to provide a method for assembling bushings and related parts wherein the dimensions of the rubber part are predetermined with respect to the outer shell and the inner sleeve therefor so that the compression, distortion or preload of the rubber part is in the order of 40% plus or minus 10%.

In carrying out the above object, it is a still further object to provide for equal restriction of flow of the rubber part for ease of assembly wherein the projected area to be compressed or preloaded is equalized with respect to the outer shell and the inner sleeve.

Further objects and advantages of the present invention will be apparent from the following description, reference being had to the accompanying drawings, wherein preferred embodiments of the present invention are clearly shown.

Figure 1:
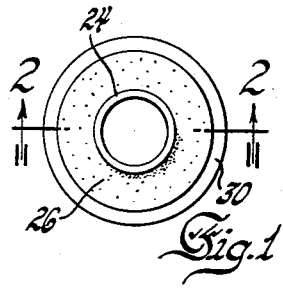
Fig. 1 is a plan view of a resilient bushing.

Resilient bushings and related parts have a multitude of uses. They are particularly desirable in automotive spring shackles, front suspensions, steering assemblies and in fact, in any application where a resilient bushing is desirable for eliminating shock, vibration, etc. and for providing some mobility in assembly.

Bushings of this general character have been used for many years and have been assembled through numerous processes, the most common being to bond the rubber part in unstressed condition to an inner sleeve and an outer shell and then to preload the rubber part by swaging the outer shell for compressing the rubber part axially of the bushing to provide a preload thereon.

Another type of assembly comprehends the use of an inner sleeve of larger diameter than the bore in the unstressed rubber part and an outer sleeve of substantially the same diameter as the outer dimension of the unstressed rubber part. In this type, the rubber part is assembled in the outer sleeve and the inner sleeve is then forced through the bore of the rubber part for expanding and preloading the same and maintaining the assembly. Still another procedure is to reverse the dimensional limitations with respect to the foregoing assembly wherein the inner sleeve is a substantially free fit in the inner bore of the unstressed rubber bushing and wherein the outer diameter thereof is considerably larger than the inner diameter of the outer shell whereby upon assembly the rubber part is preloaded. Still another method of assembly is to bond the rubber part to the inner or outer metal member wherein the unbonded diameter is either smaller or larger than the part to which the final assembly is to be made whereby the rubber part is stressed upon assembly to achieve the preload.

All of these methods of assembly have been used with a degree of success wherein the extent of preloading is not a critical factor; however, where a high preload is desired, that is to say, where the bushing is to have a minimum of resilient action and yet provides some mobility, it is difficult to follow the prior art procedures. The bonding procedures, while producing satisfactory bushings, are costly and are therefore not desirable in high production efforts. The mere assembly of the parts by preloading through one member or the other is undesirable since it is difficult to maintain assembly of the parts. In other words, when heavy preloading is desirable, the preloading adjacent one member only is so great that the tendency of the part to become disassembled creates serious production problems.

The present invention is directed to a method of assembly wherein the parts may be mechanically assembled without bonding and wherein heavy preloading may be used with no tendency for disassembly of the parts after the operation is completed.

This is accomplished by calculating the projected areas to be stressed so that equal stress or preloading is imposed at both the inner and outer surfaces of the rubber part whereby there is equal drag against the inner and outer members to maintain the several parts in assembled relation. Furthermore, this facilitates a one-step assembly program wherein all parts are assembled in one stroke of the assembly press and wherein said parts maintain the assembled position due to a predetermined substantially equal frictional drag on both the inner and outer members with respect to the rubber part.

In calculating the equal areas to be stressed, the following formula may be used:

$R_0$ equals unstressed radius of outer diameter
$R_1$ equals unstressed radius of inner diameter
$r_0$ equals stressed or confined radius of outer diameter
$r_1$ equals stressed or confined radius of inner diameter The equal areas under compression at the inner diameter and outer diameter of the bushing may then be expressed as follows:

$$\pi(R_0^2 - r_0^2) = \pi(r_1^2 - R_1^2)$$

or, simplifying the formula:

$$R_0^2 + R_1^2 = r_0^2 + r_1^2$$

Figure 2:
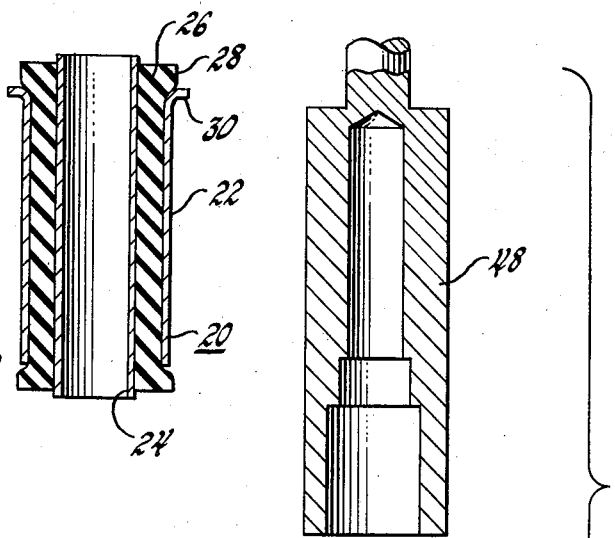
Fig. 2 is a section taken on line 2—2 of Fig. 1.

Referring to the drawings, a simple shackle type bushing is shown in Fig. 2 at 20. This bushing includes an outer shell 22 and an inner sleeve 24 having a resilient portion 26 concentrically arranged and compressed therebetween. The portion 26 protrudes from the ends of the shell 22 to form flanges 28. The shell 22 is flanged at 30 in one form of the invention to form a shoulder which is used in the ultimate assembly of the device. This flange may also be present on the other end of the shell or in other embodiments, the shell may be unflanged.

Figure 3:
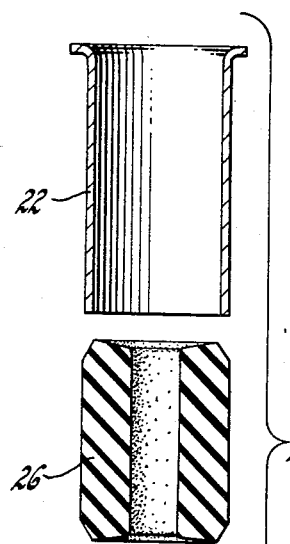
Fig. 3 is an expanded view of the parts used in the assembly of the bushing shown in Fig. 2.
Figure 4:
Fig. 4 is an end view of the rubber parts in unrestricted condition wherein the projected areas to be preloaded are indicated.

Fig. 3 shows a breakdown of the several parts in the unassembled condition. In this view it will be noted that the rubber part 26 when unstressed has a greater outer diameter than the inner diameter of the shell 22 and has a smaller bore diameter than the outer diameter of the sleeve 24. In Fig. 4 these relationships are clearly shown wherein the heavily shaded areas adjacent the outer diameter and the inner diameter indicate the portions of the rubber part which are ultimately stressed or preloaded during the assembly thereof. These portions, according to the teachings of this invention have substantially equal areas so that it may be said that the projected area to be stressed at the bore and at the outer diameter of the bushing is substantially the same. This produces equal friction or drag on the rubber part as it passes along the sleeve and the shell during assembly whereby the rubber part maintains its assembled position due to the equalized friction between the rubber part and the metal parts. As previously stated, this is not true where unequal drags are present and when the rubber part is heavily preloaded there is a distinct tendency for the part to creep out of the inner shell or for the sleeve to creep out of the rubber part as the case may be in accordance with the preload. It is understood that during assembly of these parts a suitable lubricant is used, which lubricant generally aggravates the tendency of the parts to become disassembled.

Figure 5:
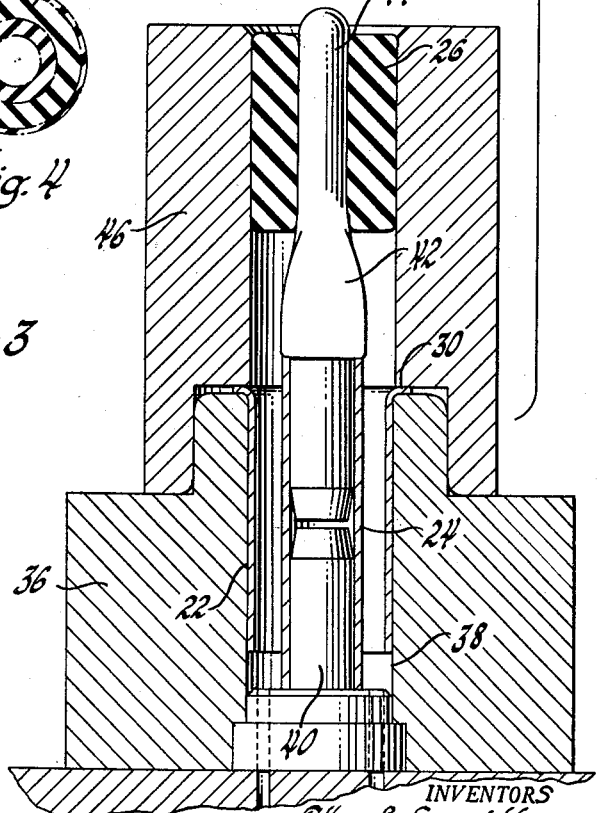
Fig. 5 is an expanded view of the apparatus used in the assembly of the bushing.
Figure 6:
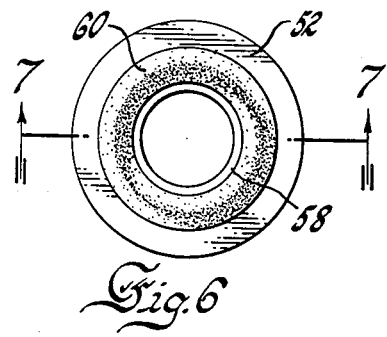
Fig. 6 is a plan view of another type of resilient rubber bushing.
Figure 7:
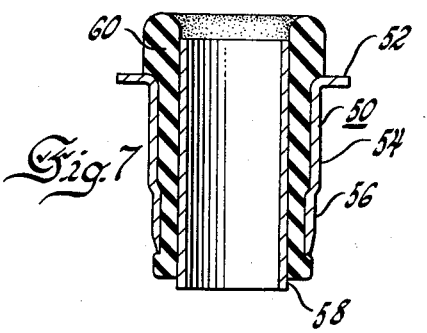
Fig. 7 is a section taken on line 7—7 of Fig. 6.

Fig. 5 shows diagrammatically an apparatus used in the assembly of the several parts. In Fig. 5 a lower block 36 includes a cavity or bore 38 therein which surrounds a stationary pilot rod 40 which is of a size suitable for aligning the inner sleeve 24 thereon. The bore 38 is of a diameter sufficient to accommodate the outer sleeve 22 therein. Thus, the inner sleeve and the outer shell are properly concentrically positioned with respect to one another in the die block 36. At the outer end of the sleeve 24 a torpedo type pilot 42 is positioned which fits within the sleeve 24 and has an extended small diameter pilot 44 extending therefrom. The rubber part 26 is assembled on this extended pilot 44 and is enclosed by an upper die block 46 against expansion thereof. The rubber part is suitably lubricated as are the other parts prior to positioning in the assembly apparatus. An upper punch member 48 including a progressively reduced inner diameter is provided which descends upon the rubber part 26 and causes it to move downwardly on the pilot 44. As the rubber part approaches the expanded torpedo pilot 42 it is expanded outwardly so that it can pass over the inner sleeve 24. At substantially the same time the outer diameter abuts the rounded corners of the flange 30 and is compressed inwardly into the outer sleeve 22. The punch continues its downward motion until the assembly is complete whereupon the punch is retracted, the upper die block 46 is removed and the bushing may be removed from the lower die block 36. This entire operation is accomplished by a very rapid downward movement of the punch 48. The faster the assembly is made, the more uniform are the bushings obtained thereby since the preloading is accomplished so rapidly that there is no tendency toward uneven drag which might occur even with the specific dimensional limitations set forth if a slow assembly were to be used. The finish of the various parts in the assembly apparatus is important and they should be polished to reduce friction and drag of the rubber part on the several parts of the assembly apparatus.

In the past, soap, water, waxes and various oils have been used to reduce friction during the assembly of the rubber part. These materials, while producing satisfactory lubrication, have a tendency to maintain a slippery surface for some time in the assembly, which aggravates the tendency toward disassembly. In the present invention we prefer to use a lubricant which in itself is a cement, for example, a rubber cement in a solvent, such as rubber dissolved in benzene, to which has been added a light oil or the cement may be of a phenol formaldehyde condensation product type in a suitable solvent, etc. In all cases, the lubricant decreases friction during the assembly operation but upon final assembly, due to the slight degree of heat developed during the assembly operation, the lubricant changes to a sticky material which forms a bond of moderate strength between the rubber part and the metal. It is to be understood that while we prefer to use a cement type lubricant, that soap water and oily substances heretofore used will operate satisfactorily in the present process, if desired.

Figure 8:
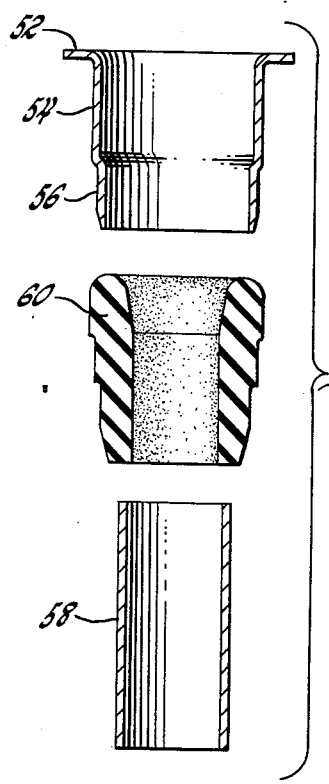
Fig. 8 is an expanded view of the parts used in the assembly of the bushing shown in Fig. 7.
Figure 9:
Fig. 9 is an end view of the rubber part used in the bushing shown in Fig. 7 in unstressed condition with the areas to be preloaded being indicated.

A front suspension bushing is shown in Figs. 6 through 10 wherein the bushing includes an outer shell 50 having a flange 52 at one end thereof and having a cylindrical portion including two steps 54 and 56 which are progressively of less diameter. The inner sleeve 58 is of a uniform diameter throughout while the rubber bushing is shown in 60. In Fig. 8 the expanded view shows the parts in unassembled condition wherein the rubber part is shown and includes three separate diameters thereon. In this connection each diameter of the bushing is treated alike, that is to say, each portion of the bushing has its diameters calculated as if the bushing were a simple cylindrical bushing so that the projected area on each portion of the bushing with respect to the shell and sleeve to which it is to be assembled are in the same proportions as for a simple bushing. Fig. 9 shows a view of the bushing from the upper side thereof and the ultimately preformed areas are shown in heavy shading, which areas are equal or substantially equal so that the assembly procedure and principle is identical to that disclosed in connection with the bushing shown in Figs. 1 through 5.

Figure 10:
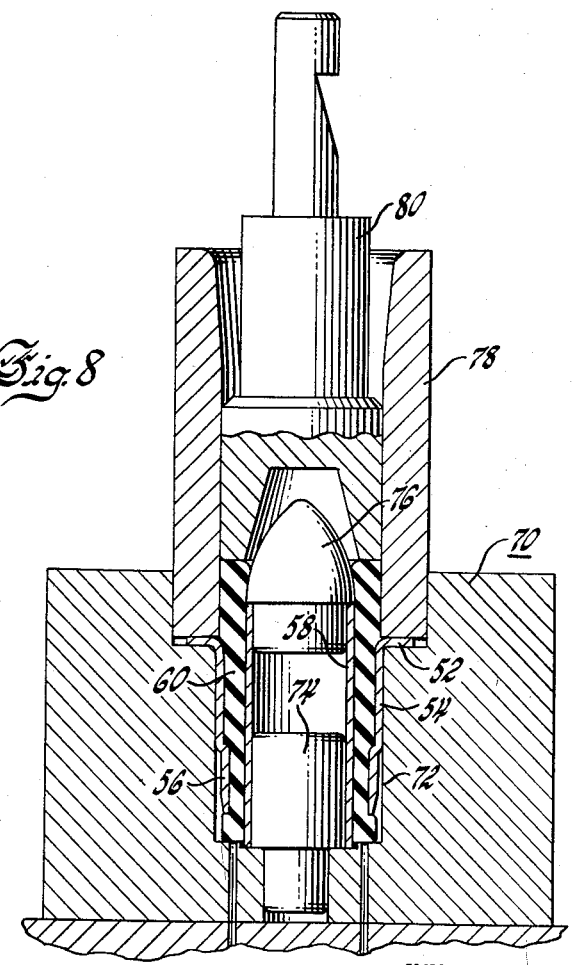
Fig. 10 is a view of the apparatus used in the assembly of the bushing wherein the bushing is shown in assembled form.

One type of assembly apparatus for use with this bushing is shown in Fig. 10 wherein the lower die block 70 includes an inner bore 72 therein which accommodates the outer shell 50. The inner sleeve 58 is centered within the outer shell 50 by means of a centrally located pilot rod 74. At the upper end of the inner sleeve 58 a torpedo 76 is placed to aid in the entry of the sleeve into the rubber part. It will be noted that the torpedo has an outer diameter substantially the same as the outer diameter of the sleeve 58. In assembly, the rubber part 60 is placed in an upper guide member 78 having a central bore with a diameter substantially the same as the diameter of the unstressed rubber part at its larger portion. A punch 80 operates within this bore and causes the rubber part to move downwardly therethrough over the torpedo 76 and into the space between the outer shell 50 and the inner sleeve 58. Here again, a suitable lubricant is used and the assembly of the parts is carried out as rapidly as possible to prevent wall friction from becoming a determining factor.

It is apparent that any cylindrical shaped bushing may be made in accordance with the teachings of this invention wherein in every case the free rubber has projected areas for preloading equal with respect to inner and outer diameters thereof whereby equal frictional drags are provided in the assembled structure. Where the bushing includes a plurality of various diameters this same procedure is carried out in calculating the free diameter of the rubber part and in these cases the several diameters are calculated in the same manner as a simple cylindrical bushing, each section of the rubber part being calculated separately with respect to the assembled diameters thereof.

A specific example of dimensions used in a simple bushing are as follows:

Outer sleeve—
    I.D. _____ 1.03"
    Length _____ 2.05"
Inner sleeve—
    O.D. _____ .633"
    Length _____ 2.56"
Rubber part (unstressed)—
    O.D. _____ 1.14"
    I.D. _____ .400"
    Length _____ 1.54"

In all cases the metal members may be steel, brass, copper, nickel, etc., either seamless or butted. The rubber part may be made from recipes including an elastomer taken from the class of natural rubber, butadiene styrene copolymers, butadiene acrylonitrile copolymers, polychloroprenes, reclaims, either alone or in compatible mixtures wherein the part is made from a compounded and vulcanized stock including the elastomer as a basic ingredient. The compounding may be varied for obtaining various degress of hardness in the stock and in this respect we prefer to use materials having durometer readings of 50 to 70 although other hardness may be desirable in specific applications.

While the forms of embodiment of the invention as herein disclosed constitute preferred forms, it is to be understood that other forms might be adopted, as may come within the scope of the claims which follow:

What is claimed is as follows:

1. A flexible joint, comprising, an outer member, an inner member positioned coaxially within the outer member, an annular surface around the outer member at one end thereof and extending radially outwardly thereof in a plane substantially normal to the axis of the member, an elastomeric bushing having a main body portion interposed between the inner and outer members in a state of 40% ±10% equalized radial compression as based upon the unstressed areas of a plane taken normal to the axis of the bushing compared with the area of the same plane in the stressed condition, said state of equalized radial compression being further defined by the inner and outer radii of said bushing in the installed condition compared to the same radii of the bushing in the free state respectively wherein the sum of the squares of the inner and outer radii respectively in the unstressed condition is substantially equal to the sum of the squares of the inner and outer radii respectively in the stressed condition, said bushing being held in place between said members solely by the equalized compression between said bushing and the surfaces of the members.

2. A flexible joint, comprising, an outer member, an inner member positioned coaxially within the outer member, an annular surface around the outer member at one end thereof and extending radially outwardly thereof in a plane substantially normal to the axis of the member, an elastomeric bushing having a main body portion interposed between the inner and outer members in a state of 40% ±10% equalized radial compression as based upon the unstressed areas of a plane taken normal to the axis of the bushing compared with the area of the same plane in the stressed condition, said state of equalized radial compression being further defined by the inner and outer radii of said bushing in the installed condition compared to the same radii of the bushing in the free state respectively wherein the sum of the squares of the inner and outer radii respectively in the unstressed condition is substantially equal to the sum of the squares of the inner and outer radii respectively in the stressed condition, said elastomeric bushing including a substantially unstressed portion at least partially overlying the radial outward extension of the outer member, said bushing being held in place between said members solely by the equalized compression between said bushing and the surfaces of the members.

3. A flexible joint, comprising, an outer member, an inner member positioned coaxially within the outer member, an annular surface around the outer member at one end thereof and extending radially outwardly thereof in a plane substantially normal to the axis of the member, an elastomeric bushing having a main body portion interposed between the inner and outer members in a state of 30% equalized radial compression as based upon the unstressed areas of a plane taken normal to the axis of the bushing compared with the area of the same plane in the stressed condition, said state of equalized radial compression being further defined by the inner and outer radii of said bushing in the installed condition compared to the same radii of the bushing in the free state respectively wherein the sum of the squares of the inner and outer radii respectively in the unstressed condition is substantially equal to the sum of the squares of the inner and outer radii respectively in the stressed condition, said elastomeric bushing including a substantially unstressed portion at least partially overlying the radial outward extension of the outer member, said bushing being held in place between said members solely by the equalized compression between said bushing and the surfaces of the members.

References Cited in the file of this patent

UNITED STATES PATENTS

| | | |
|---|---|---|
| 1,461,130 | Loughead | July 10, 1923 |
| 1,888,642 | Tryon | Nov. 22, 1932 |
| 1,961,536 | Thiry | June 5, 1934 |
| 2,031,797 | Tarbox | Feb. 25, 1936 |
| 2,550,564 | Hutton | Apr. 24, 1951 |
| 2,572,215 | Swart | Oct. 23, 1951 |
| 2,608,751 | Hutton | Sept. 2, 1952 |
| 2,661,969 | Thiry | Dec. 8, 1953 |
| 2,725,148 | Sanford et al. | Nov. 29, 1955 |